United States Patent [19]

Kawai et al.

[11] Patent Number: 4,899,127

[45] Date of Patent: Feb. 6, 1990

[54] SIZE COMPARING CIRCUIT

[75] Inventors: Hiroyuki Kawai; Kazuya Ishihara, both of Itami, Japan

[73] Assignee: Mitsubishi Denki Kabushiki Kaisha, Japan

[21] Appl. No.: 242,006

[22] Filed: Sep. 8, 1988

[30] Foreign Application Priority Data

Jan. 21, 1988 [JP] Japan .................................. 63-11207

[51] Int. Cl.$^4$ .............................................. G06F 7/02
[52] U.S. Cl. ................................................. 340/146.2
[58] Field of Search ............... 340/146.2; 364/715.06, 364/715.01, 715.11

[56] References Cited

U.S. PATENT DOCUMENTS

| 3,534,404 | 10/1970 | Hanson | 340/146.2 |
| 4,012,714 | 3/1977 | Lohmann | 340/146.2 |
| 4,755,696 | 7/1988 | Pickett | 340/146.2 |
| 4,810,995 | 3/1989 | Kondou et al. | 340/146.2 |

OTHER PUBLICATIONS

"Principles of CMOS VLSI Design," Neil H. E. Weste, et al., pp. 333-335.

Primary Examiner—Gary V. Harkcom
Assistant Examiner—Dale M. Shaw
Attorney, Agent, or Firm—Townsend & Townsend

[57] ABSTRACT

A size comparing circuit adopts a configuration wherein bits of two binary numbers to be compared corresponding to each other are compared sequentially from the most significant bit (MSB) side by one-bit judging device, and when one bit is judged to be larger as a result of this comparison, the binary number containing that bit is judged to be larger, so that, in the case where each pair of bits are compared from the MSB side and the values of both bits corresponding to each other differ, the result thereof is found immediately.

3 Claims, 4 Drawing Sheets

Fig. 3

| A | B | $C_{i1}$ | $C_{o1}$ |
|---|---|---|---|
| 0 | 0 | 0 | 0 |
| 0 | 1 | 0 | 0 |
| 1 | 0 | 0 | 1 |
| 1 | 1 | 0 | 0 |
| 0 | 0 | 1 | 1 |
| 0 | 1 | 1 | 1 |
| 1 | 0 | 1 | 1 |
| 1 | 1 | 1 | 1 |

| A | B | $C_{i2}$ | $C_{o2}$ |
|---|---|---|---|
| 0 | 0 | 0 | 0 |
| 0 | 1 | 0 | 1 |
| 1 | 0 | 0 | 0 |
| 1 | 1 | 0 | 0 |
| 0 | 0 | 1 | 1 |
| 0 | 1 | 1 | 1 |
| 1 | 0 | 1 | 1 |
| 1 | 1 | 1 | 1 |

SIZE COMPARING CIRCUIT

BACKGROUND OF THE INVENTION

1. Field of the Invention

The present invention relates to a circuit for making a comparison between sizes of two numeric data in a microprocessor or the like, and to be further detailed, relates to a size comparing circuit capable of finding the compared result in a shorter processing time in comparison with the conventional ones.

2. Description of the Prior Art

FIG. 1 is a block diagram showing an example of configuration of a size comparing circuit carrier in "Principles of CMOS VLSI Design", p. 333-335, by Neil H. E. Weste and Kamran Eshraghian.

In FIG. 1, numerals 53a, 53b, 53c, 53d and 53e designate full adders respectively, which are connected in a carry-series manner that an output terminal Co of each adder is connected sequentially to a carry input terminal Ci of the following stage.

Also, in FIG. 1, symbols $A_3, A_2, A_1, A_0$ and $B_3, B_2, B_1, B_0$ designate respective bits of data DA and DB of natural binary number whose MSBs (Most Significant Bit) are $A_3$ and $B_3$ respectively. Then, the LSB (Least Significant Bit) $A_0$ of the data DA is inputted to one of data input terminals $a_1$ of the first full adder 53a, and the LSB $B_0$ of the data DB inverted by an inverter 52a is inputted to the other data input terminal $a_2$.

Furthermore, the respective bits $A_1, A_2, A_3$ and $B_1, B_2, B_3$ of the both data DA and DB are inputted sequentially to both data input terminals of each of the other full adders 53b, 53c and 53d respectively.

In addition, a power source voltage, that is, a binary code "1" is inputted to the carry input Ci of the first full adder 53a, a ground voltage, that is, a binary code "0" is inputted to the first data input terminal $a_1$ of the fifth full adder 53e, and the power source voltage, that is, the binary code "1" is inputted to the second data input terminal $a_2$ of the same, respectively.

Also, output signals $S_0, S_1, S_2, S_3$ and $S_s$ of the respective full adders 53a, 53b, 53c, 53d and 53e are respective bits of an added result signal wherein $S_s$ is a sign bit representing "+" or "−".

Such a conventional size comparing circuit is operated as follows.

To make a size comparison between natural binary numbers, a sign bit is added to each natural binary number, and subtraction is performed as binary numbers expressed by twos complement, and judgment has only to be made on whether the result of the subtraction is positive or negative. Also, subtraction of binary numbers of twos complement expression by the full adder is given by $(A + \bar{B} + 1)$; where A is minuend and B is subtrahend. Note that $\bar{B}$ is an inverted value of B, that is, if B is "1", $\bar{B}$ is "0", and if B is "0", $\bar{B}$ is "1".

FIG. 1 is a circuit for realizing the above-described processing, the sign bit "0" to be added to the natural binary number DA ($A_3 A_2 A_1 A_0$) is inputted by a "0" input to the first data input terminal $a_1$ of the fifth full adder 53e, and the respective bits $B_0$ to $B_3$ of the data DB are inverted by inverters 52a to 52d, and are inputted as $\bar{B}_0$ to $\bar{B}_3$, respectively. Also, the sign bit "0" to be added to the natural binary number DB ($B_3 B_2 B_1 B_0$) are inverted to "1" and is inputted by a "1" input to the second data input terminal $a_2$ of the fifth full adder 53e.

Then, since "1" has been inputted to the carry input Ci of the first full adder 53a, subtraction is performed by inputting the respective bits of $A_3, A_2, A_1, A_0$ and $B_3, B_2, B_1, B_0$ of the natural binary numbers DA and DB and thereby the result is obtained as a binary number ($S_s S_3 S_2 S_1 S_0$) of twos complement expression.

At this time, it can be judged that which natural binary number is larger by the sign bit $S_s$ of the fifth full adder.

This means that

If $S_s = $ "0", DA($A_3 A_2 A_1 A_0$) $\geq$ DB($B_3 B_2 B_1 B_0$), and
If $S_s = $ "1", DA($A_3 A_2 A_1 A_0$) $<$ DB($B_3 B_2 B_1 B_0$).

Accordingly, the size comparison between two natural binary numbers can be made by the circuit shown in FIG. 1.

In the conventional size comparing circuit as described above, a large number of full adders are required, and therefore such deficiencies exist as that the circuit configuration is complicated and the circuit scale is made larger, and further the processing time is extended since processing is required to be performed on all the bits of data to be processed in order to obtain the result. This problem of processing time, needless to say, becomes more serious with increase in the number of bits of data.

SUMMARY OF THE INVENTION

The present invention has been achieved in light of such circumstances, and the principal object thereof is to realize a size comparing circuit capable of quickly obtaining the result of size comparison by a simpler circuit configuration by small number of elements in comparison with the conventional ones.

A size comparing circuit in accordance with the present invention adopts a configuration wherein bits corresponding to each other are compared in sequence by one-bit judging means from the MSB side of two binary numbers to be processed, and when one of the bits is judged to be larger by the result of this comparison, the binary number containing that bit is judged to be larger.

In the size comparing circuit of the present invention, by adopting such a configuration, each bit is compared from the MSB side, and therefore the result thereof is found immediately when the values of the both bits corresponding to each other differ.

The above and further objects and features of the invention will more fully be apparent from the following detailed description with accompanying drawings.

BRIEF DESCRIPTION OF THE DRAWINGS

FIG. 3 is a truth value table showing an operational principal of an one-bit judging means thereof.

DESCRIPTION OF THE PREFERRED EMBODIMENTS

Hereinafter, detailed description is made on the present invention in reference to the drawings showing embodiments thereof.

Figure 1:
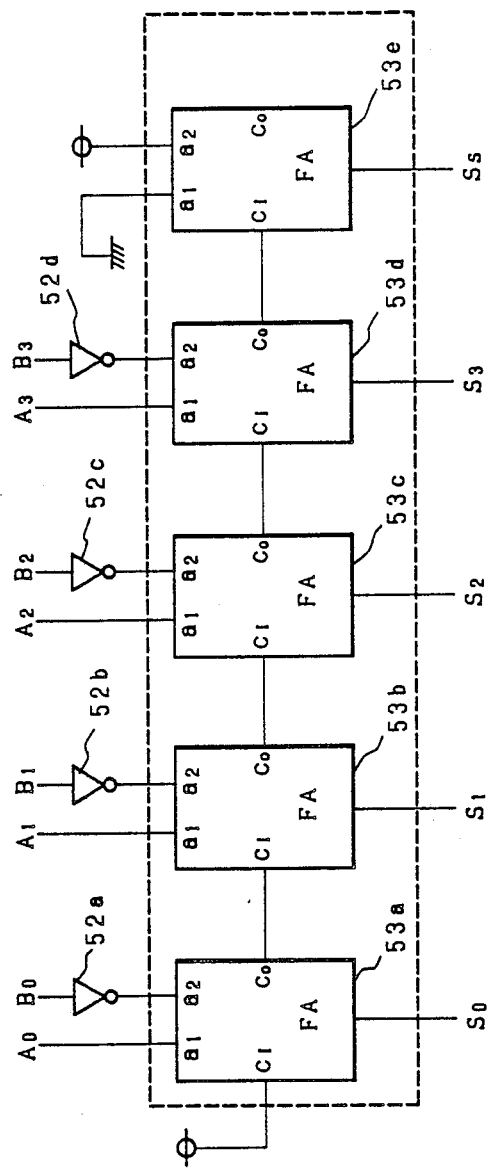
FIG. 1 is a block diagram showing the prior art.
Figure 2:
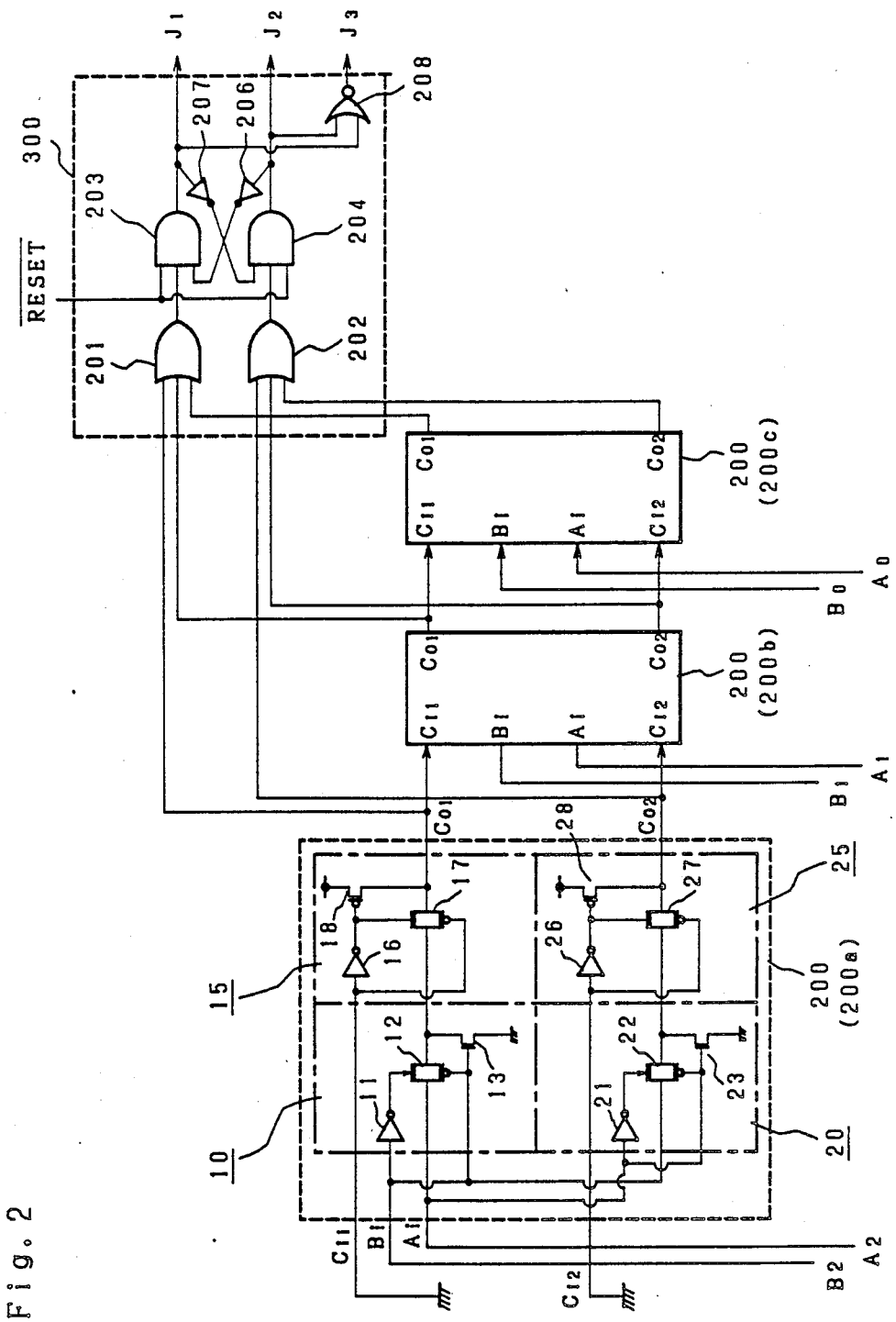
FIG. 2 is a circuit diagram showing a configuration of a size comparing circuit in accordance with the present invention.

FIG. 2 is a circuit diagram showing one embodiment of configuration of a size comparing circuit in accordance with the present invention.

In addition, in the following embodiments, for explanatory convenience sake, data to be processed are assumed to have three bits respectively, and specifically a first binary data DA is assumed to be ($A_2$ $A_1$ $A_0$) and a second binary data DB to be ($B_2$ $B_1$ $B_0$).

In the figure, numerals 200a, 200b and 200c designate one-bit judging means 200, respectively. The respective one-bit judging means 200a, 200b and 200c have quite the same configuration as described below.

The one-bit judging means 200 is provided with a first and a second data input terminals Ai and Bi, a first and a second external input terminals $Ci_1$ and $Ci_2$, and a first and a second external output terminals $Co_1$ and $Co_2$.

The first and the second data input terminals Ai and Bi are connected to a first comparing means 10 and a second comparing means 20, respectively.

The both comparing means 10 and 20 have basically the same configuration, and the first comparing means 10 is configured with an inverter 11, a transfer gate 12, and N-channel transistor 13 and the like, and the second comparing means 20 is configured with an inverter 21, a transfer gate 22, and N-channel transistor 23 and the like, respectively.

Specifically, in the first comparing means 10, the first data input terminal Ai is connected to the input of the transfer gate 12, and the second data input terminal Bi is connected to the gate electrode of N-channel transistor of the transfer gate 12 through the inverter 11, and is connected directly to the gate electrode of P-channel transistor of the transfer gate 12, and is further connected to the gate electrode of the N-channel transistor 13. Then the output of the transfer gate 12 and the drain electrode of the N-channel transistor 13 are given to a first compared result outputting means 15, and the source electrode of the N-channel transistor 13 is grounded.

On the other hand, in the second comparing means 20, the second data input terminal Bi is connected to the input of the transfer gate 22, and the first data input terminal Ai is connected to the gate electrode of N-channel transistor of the transfer gate 22 through the inverter 21, and is connected directly to the gate electrode of P-channel transistor of the transfer gate 22, is further connected to the gate electrode of the N-channel transistor 23. Then, the output of the transfer gate 22 and the drain electrode of the N-channel transistor 23 are given to a second compared result outputting means 25, and the source electrode of the N-channel transistor 23 is grounded.

The first compared result outputting means 15 and the second compared result outputting means 25 also have basically the same configuration, and are configurated respectively with inverters 16 and 26, transfer gates 17 and 27, P-channel transistors 18 and 28 and the like.

Specifically, in the first compared result outputting means 15, the output of the first comparing means 10 is given to the input of the transfer gate 17, and the external input terminal $Ci_1$ is connected to the gate electrode of N-channel transistor of this transfer gate 17 through the inverter 16, and is connected directly to the gate electrode of P-channel transistor of the transfer gate 17. The output of this transfer gate 17 is connected to the first external output terminal $Co_1$. Furthermore, the output of the inverter 16 is given to the gate electrode of the P-channel transistor 18. Then, the source electrode of the P-channel transistor 18 is connected to the power source potential and the drain electrode thereof is connected to the first external output terminal $Co_1$, respectively.

On the other hand, in the second compared result outputting means 25, the output of the second comparing means 20 is given to the input of the transfer gate 27, and the second external input terminal $Ci_2$ is connected to the gate electrode of N-channel transistor of this transfer gate 27 through the inverter 26, and is connected directly to the gate electrode of P-channel transistor of the transfer gate 27. The output of this transfer gate 27 is connected to the second external output terminal $Co_2$. Furthermore, the output of the inverter 26 is given to the gate electrode of the P-channel transistor 28. Then, the source electrode of the P-channel transistor 28 is connected to the power source potential and the drain electrode thereof is connected to the second external output terminal $Co_2$, respectively.

As shown in FIG. 2, the one-bit judging means 200 having the configuration as described above are connected in a cascade fashion by a number equal to the number of bits of the binary data to be processed, that is, in this embodiment, three pieces of the first one-bit judging means 200a to the third one-bit judging means 200c are connected sequentially in a manner that the first external output terminal $Co_1$ of the first one-bit judging means 200a is connected to one input of a first OR gate 201 and the first external input terminal $Ci_1$ of the second one-bit judging means 200b of the following stage, and the second output terminal $Co_2$ is connected to one input of a second OR gate 202 and the second external input terminal $Ci_2$ of the second one-bit judging means 200b of the following stage.

Note that the ground potential, that is, the fixed value "0" of the binary number is inputted to both the first and the second external input terminals $Ci_1$ and $Ci_2$, and the external output terminals $Co_1$ and $Co_2$ of the one-bit judging means 200c of the last stage are inputted only to the OR gates 201 and 202, respectively.

Also, to the first data input terminal Ai of each of the one-bit judging means 200a, 200b and 200c, each of the bits ($A_2$ $A_1$ $A_0$) of the first binary data DA is inputted in that order, and to each second data input terminal Bi, each of the bits of the second binary data DB ($B_2$ $B_1$ $B_0$) is inputted in that order.

In the figure, numeral 300 designates a judging means, and is configurated with the above-described OR gates 201 and 202, two AND gates 203 and 204, two inverters 206 and 207, a NOR gate 208 and the like.

Specifically, the output of the first OR gate 201 is given to one input of the first three-input AND gate 203, and the output of the second OR gate 202 is given to one input of the second three-input AND gate 204, respectively.

The output of the first AND gate 203 is outputted as a first judgment signal $J_1$ of the judging means 300, and also becomes one input of the AND gate 204 through the inverter 207, and the output of the second AND gate 204 is outputted as a second judgment signal $J_2$ of the judging means 300, and also becomes one input of the first AND gate 203 through the inverter 206. Then, a low-active reset signal RESET is given to the last one input of each of the AND gates 203 and 204.

Also, the outputs of the both AND gates 203 and 204 are inputted to the NOR gate 208, and the output of this NOR gate 208 becomes a third judgment signal $J_3$ of the judging means 300.

Operation of the size comparing circuit of the present invention configurated as described above is as follows.

In addition, relationships among values of the both data input terminals Ai and Bi and the both external input terminals $Ci_1$ and $Ci_2$ and values of the output terminal Co follow truth value tables as shown in FIG. 3.

First, in making a comparison between both the binary data DA ($A_2 A_1 A_0$) and DB ($B_2 B_1 B_0$), the low-active reset signal $\overline{\text{RESET}}$ is given to both the AND gates 203 and 204, and the outputs of both the AND gates 201 and 202 are set to "0". Thereby, the first and the second judgment signal $J_1$ and $J_2$ go to "0", and the third judgment signal $J_3$ goes to "1", but the third judgment signal $J_3$ is made effective only after the processing of all bits has been completed.

In the one-bit judging means 200a of the first stage, the MSBs $A_2$ and $B_2$ of both the data DA and DB are inputted to the first data input terminal Ai and the second data input terminal Bi respectively, and the fixed value "0" is inputted to both the first and the second external input terminals $Ci_1$ and $Ci_2$.

Accordingly, from FIG. 3, if $A_2$="1" and $B_2$="0", in other words, if the data DA is larger than the data DB, the first external output terminal $Co_1$ of the one-bit judging means 200a of the first stage goes to "1", and therefore the output of the first OR gate 201 immediately turns to "1". Thereby, the first judgment signal $J_3$ also turns to "1".

On the other hand, if $A_2$="0" and $B_2$="1", in other words, if the data DB is larger than the data DA, the second external output terminal $Co_2$ of the one-bit judging means 200a of the first stage goes to "1", and therefore the output of the second OR gate 202 immediately turns to "1". Thereby, the second judgment signal $J_2$ also turns to "1".

This means that in the above-described example, judgment can be made on whether the data DA or the data DB is larger only by comparing the MSBs of both the data DA and DB.

Furthermore, in the case of $A_2=B_2$, that is, $A_2$="1" and $B_2$="1", or $A_2$="0" and $B_2$="0", both the external output terminals $Co_1$ and $Co_2$ of the first one-bit judging means 200a of the first stage go to "0". In this case, the both the judgment signals $J_1$ and $J_2$ hold "0". Also, both the external input terminals $Ci_1$ and $Ci_2$ of the one-bit judging means 200b of the second stage are given "0", and therefore the values of both the external output terminals $Co_1$ and $Co_2$ of the second one-bit judging means 200b are determined according to the values, that is, the size relation between the bits $A_1$ and $B_1$ of the both data DA and DB.

The values of both the external output terminals $Co_1$ and $Co_2$ of this second one-bit judging means 200b are determined in quite the same manner as in the case of the above-mentioned one-bit comparing circuit 200a of the first stage, and therefore if $A_1$="1" and $B_1$="0", the first judgment signal $J_1$ turns to "1", and in reverse, if $A_1$="0" and $B_1$="1", the second judgment signal $J_2$ turns to "1", respectively.

In other words, in the case where the MSBs of both the data are equal, whether the data DA or the data DB is larger can be judged at the point of a comparison between the bits of one lower order.

Also, in the case where the result of comparison by the one-bit judging means 200b of this second stage is equal, that is, the bits $A_1$ and $B_1$ are both "1" or "0", both the external outputs of the one-bit judging means 200b of the second stage go to "0", and therefore either of both the judgment signals $J_1$ and $J_2$ turns to "1" according to the result of comparison similar to the above-described by the one-bit judging means 200c of the third stage. Note that in the case where the results of comparisons of all bits are all equal, both the data DA and DB are equal, and therefore the outputs of both the AND gates 201 and 202, in other words, both the judgment signals $J_1$ and $J_2$ hold "0", and only the output of the NOR gate 208 whereto these are inputted, that is, the third judgment signal $J_3$ goes to "1".

In addition, in the case where either of the external output terminals $Co_1$ and $Co_2$ of each of the one-bit judging means 200 goes to "1", the external output terminal $Co_1$ or $Co_2$ of each of the following one-bit judging means 200 all goes to "1".

As described above,
(1) if DA>DB, the first judgment signal $J_1$ turns to "1",
(2) if DA<DB, the second judgment signal $J_2$ turns to "1", and (3) if DA=DB, the third judgment signal $J_3$ holds "1".

Accordingly, in the size comparing circuit of the present invention, the respective bits of both the data DA and DB to be compared are compared sequentially from the MSB side, and at the point when either of the first judgment signal $J_1$ or the second judgment signal $J_2$ turns to "1", the result of the size comparison is found immediately.

In addition, in the above-mentioned embodiment, the transfer gates 12, 17, 22 and 27 wherein a P-channel transistor is combined with a N-channel transistor are used, but a configuration using only transistors of either type of channel can also be adopted. Also, the judging means 300 is configured with the OR gates 201 and 202, the AND gates 203 and 204, the inverters 206 and 207, the NOR gate 208 and the like, but is not limited to this configuration.

Figure 4:
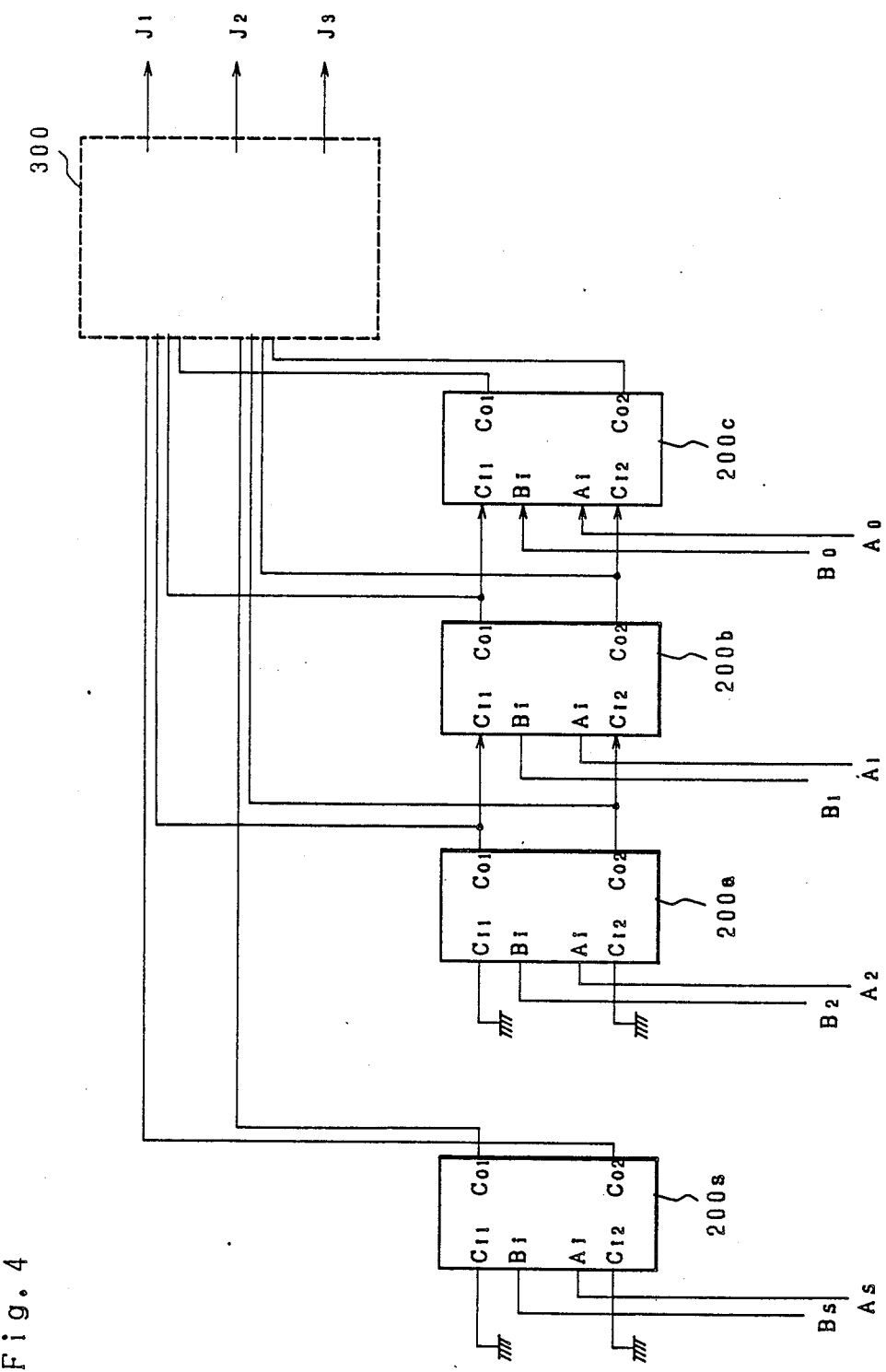
FIG. 4 is a block diagram showing another example of configuration in accordance with the present invention.

Furthermore, in the above-mentioned embodiment, only the comparison between natural binary numbers can be performed, but as shown in a block diagram of FIG. 4 as another example of configuration of the present invention, a one-bit judging means 200s having the same configuration as each one-bit judging means 200 is added, and comparison between sign bits of both the binary data DA and DB is made by this one-bit judging means 200s, and thereby the comparison between absolute binary numbers of twos complement expression with sign can be made.

In the case where the configuration as shown in FIG. 4 is adopted, in the judging means 300, a means of change-over has only to be added in a manner that corresponding to the values of both the external output terminals $Co_1$ and $Co_2$ of the one-bit judging means 200s for judging sign, if the first judgment signal $J_1$="1", DA>DB holds, and if the second judgment signal $J_2$="1", DB>DA holds, or in reverse, if the first judgment signal $J_1$="1", DB>DA holds, and if the second judgment signal $J_2$="1", DA>DB holds.

In all the above-described examples, the number of bits of data to be processed is assumed to be three, but this is utterly for explanatory convenience, and any number of bits of data can be taken, and data of any number of bits can be processed by a configuration wherein the one-bit judging means of the corresponding number are just connected in a cascade fashion.

As detailed above, in accordance with the size comparing circuit of the present invention, the respective bits are compared in sequence from the MSB side, and thereby the result of size comparison between both data is obtainable immediately only with some circuit delay at the point when it is detected that the values of the corresponding bits of both the data differ without performing processing for all the bits. Also, the circuit configuration can be simplified and miniaturized in comparison with the conventional apparatuses using full adders in a large number.

At this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A size comparing circuit for comparing sizes between a first n-bit binary data and a second n-bit binary data, comprising;

n number of one bit judging means each of which has
as a first and second data input corresponding to a bit of said first and second binary data;
a logical "0" signal as a first and second external input signal to the judging means corresponding to the Most Significant Bit,
each of said judging means having a first and second external output signals, which are used as the first and second external input signal for the next less significant bits means; and has
a first comparing means outputting "1" in the case where said first data is "1" and said second data is "0", and outputting "0", and outputting "0" in the other cases;
a second comparing means outputting "1" in the case where said second data is "1" and said first data is "0" in the other cases;
a first compared result outputting means taking an output signal of said first comparing means when the first external input signal is "0", and taking a signal "1" when the first external input signal is "1" respectively as an external output signal; and
a second compared result outputting means taking an output signal of said second comparing means when the second external input signal is "0", and taking a signal "1" when the second external input signal is "1" respectively as an external output signal; and
a judging means which has
a first gate outputting "1" when any one of outputs of said first compared result outputting means of said respective one-bit judging means is "1";
a second gate outputting "1" when any one of outputs of said second compared result outputting means of said respective one-bit judging means is "1"; and
a judgement signal outputting means outputting a first judgement signal as a result of judgment that the first binary data is larger that the second binary data when said both gate outputs are inputted and only said first gate output is "1", outputting a second judgment signal as result of judgment that the second binary data is larger than the first binary data when only said second gate output is "1", and outputting a third judgement signal as a result of judgment that the both binary data are equal when said both gate outputs are "0".

2. A size comparing circuit as set forth in claim 1, wherein said first and second gates are transfer gates composed of a P-channel transistor and an N-channel transistor whose source electrodes are connected each other and whose drain electrodes are connected each other, respectively.

3. A size comparing circuit as set forth in claim 1, wherein to one of said n number of one-bit judging means, a sign bit of said first binary data is inputted as the first data, and a sign bit of said second binary data is inputted as the second data.

* * * * *